(12) United States Patent
Martin et al.

(10) Patent No.: US 10,684,035 B2
(45) Date of Patent: Jun. 16, 2020

(54) HVAC SYSTEM THAT COLLECTS CUSTOMER FEEDBACK IN CONNECTION WITH FAILURE TRIAGE

(71) Applicant: Trane International Inc., Davidson, NC (US)

(72) Inventors: Mark Martin, Chisago City, MN (US); Brian Meyers, Woodbury, MN (US)

(73) Assignee: Trane International Inc., Davidson, NC (US)

( * ) Notice: Subject to any disclaimer, the term of this patent is extended or adjusted under 35 U.S.C. 154(b) by 75 days.

(21) Appl. No.: 15/865,061

(22) Filed: Jan. 8, 2018

(65) Prior Publication Data

US 2019/0212025 A1  Jul. 11, 2019

(51) Int. Cl.
| | |
|---|---|
| *F24F 11/38* | (2018.01) |
| *F24F 11/49* | (2018.01) |
| *H04L 12/28* | (2006.01) |
| *H04W 4/70* | (2018.01) |
| *H04W 4/33* | (2018.01) |

(52) U.S. Cl.
CPC .............. *F24F 11/38* (2018.01); *F24F 11/49* (2018.01); *H04L 12/2823* (2013.01); *H04W 4/33* (2018.02); *H04W 4/70* (2018.02)

(58) Field of Classification Search
CPC .. F24F 11/49; F24F 11/30; F24F 11/32; F24F 11/38; F24F 11/47; F24F 11/52; F24F 11/58; F24F 11/62; F24F 11/63; F24F 11/64; F24F 11/70; F24F 11/89; G05B 15/02; G05B 2219/24033; G05B 2219/2614; G05B 2219/2642; G05B 2219/31356; G05B 2219/31365
See application file for complete search history.

(56) References Cited

U.S. PATENT DOCUMENTS

| | | | |
|---|---|---|---|
| 5,463,768 A | 10/1995 | Cuddihy et al. | |
| 5,566,339 A | 10/1996 | Perholtz et al. | |
| 5,596,712 A | 1/1997 | Tsuyama et al. | |
| 5,790,780 A | 8/1998 | Brichta et al. | |
| 5,847,972 A | 12/1998 | Eick et al. | |
| 5,862,322 A | 1/1999 | Anglin et al. | |
| 5,983,364 A | 11/1999 | Bortcosh et al. | |
| 6,065,136 A | 5/2000 | Kuwabara | |
| 6,173,418 B1 | 1/2001 | Fujin et al. | |
| 6,223,544 B1 | 5/2001 | Seem | |

(Continued)

FOREIGN PATENT DOCUMENTS

WO  2015066649 A1  5/2015

*Primary Examiner* — Chun Cao
(74) *Attorney, Agent, or Firm* — The Salerno Law Firm, P.C.

(57) ABSTRACT

A heating, ventilation and air condition (HVAC) system configured for automated failure triage, inventory analysis, and customer feedback communication is provided. The HVAC system includes a controller in operable communication with at least one peripheral component of the HVAC system for receiving information relating to the at least one peripheral component, and configured to receive customer feedback information, and a server in operable communication with the controller for receiving and analyzing the information relating to the at least one peripheral component and the customer feedback information.

20 Claims, 4 Drawing Sheets

(56) References Cited

U.S. PATENT DOCUMENTS

| | | |
|---|---|---|
| 6,279,125 B1 | 8/2001 | Klein |
| 6,343,236 B1 | 1/2002 | Gibson et al. |
| 6,393,490 B1 | 5/2002 | Stiles et al. |
| 6,446,058 B1 | 9/2002 | Brown |
| 6,516,427 B1 | 2/2003 | Keyes et al. |
| 6,539,499 B1 | 3/2003 | Stedman et al. |
| 6,681,348 B1 | 1/2004 | Vachon |
| 6,725,398 B1 | 4/2004 | Varma et al. |
| 6,859,783 B2 | 2/2005 | Cogger et al. |
| 6,892,317 B1 | 5/2005 | Sampath et al. |
| 7,086,034 B2 | 8/2006 | Mihara |
| 7,120,819 B1 | 10/2006 | Gürer et al. |
| 7,191,364 B2 | 3/2007 | Hudson et al. |
| 7,257,743 B2 | 8/2007 | Glerum et al. |
| 7,321,988 B2 | 1/2008 | Guo et al. |
| 7,325,170 B2 | 1/2008 | Srinivasan et al. |
| 7,328,376 B2 | 2/2008 | McGuire et al. |
| 8,332,765 B2 | 12/2012 | Ergan et al. |
| 8,527,814 B1 | 9/2013 | Elwell et al. |
| 8,621,282 B1 | 12/2013 | Mixter et al. |
| 8,659,302 B1 | 2/2014 | Warren et al. |
| 8,694,831 B2 | 4/2014 | Arapov et al. |
| 9,424,115 B2 | 8/2016 | Jiang et al. |
| 10,274,945 B2 * | 4/2019 | Arensmeier ............ G05B 15/02 |
| 2002/0194550 A1 | 12/2002 | Lopke |
| 2003/0056140 A1 | 3/2003 | Taylor et al. |
| 2004/0123188 A1 | 6/2004 | Srinivasan et al. |
| 2004/0128583 A1 | 7/2004 | Iulo et al. |
| 2004/0249914 A1 | 12/2004 | Flocken et al. |
| 2006/0112106 A1 | 5/2006 | Wolf et al. |
| 2007/0225849 A1 * | 9/2007 | Norbeck .................. F24F 11/30 700/107 |
| 2008/0262860 A1 | 10/2008 | Schneider et al. |
| 2010/0229112 A1 | 9/2010 | Ergan et al. |
| 2010/0333066 A1 | 12/2010 | Feniello et al. |
| 2011/0238768 A1 | 9/2011 | Habets et al. |
| 2014/0074730 A1 | 3/2014 | Arensmeier et al. |
| 2014/0266755 A1 * | 9/2014 | Arensmeier ............ G05B 15/02 340/679 |
| 2015/0127171 A1 | 5/2015 | Quam et al. |
| 2015/0127172 A1 * | 5/2015 | Quam ...................... F24F 11/63 700/276 |
| 2015/0261596 A1 | 9/2015 | Muthukumsarasamy et al. |
| 2015/0330861 A1 * | 11/2015 | Alsaleem ............... G01M 3/025 702/183 |
| 2015/0347220 A1 | 12/2015 | Hermany et al. |
| 2015/0350045 A1 | 12/2015 | Fan et al. |
| 2016/0110238 A1 | 4/2016 | Burugula et al. |
| 2016/0370023 A1 * | 12/2016 | Stewart ............. G05B 13/0265 |
| 2019/0063770 A1 * | 2/2019 | Vairamudi ................ F24F 11/89 |

\* cited by examiner

HVAC SYSTEM THAT COLLECTS CUSTOMER FEEDBACK IN CONNECTION WITH FAILURE TRIAGE

BACKGROUND

Field of the Disclosure

The present disclosure generally relates to a heating, ventilation and air conditioning (HVAC) system, and more particularly, to an HVAC system configured for automated failure triage, inventory analysis, and customer feedback communication.

Description of the Related Art

HVAC systems which regulate environmental conditions within an enclosed area of a commercial building (or residential home) are known. Residential HVAC systems are typically controlled by a thermostat, e.g., a smart thermostat. With respect to commercial buildings, the HVAC systems are typically controlled by a building automation system (BAS) or HVAC equipment control system. The thermostat or BAS can also be used to control security, lighting, power, etc. of the building.

While conventional thermostats or BASs are configured to provide efficient control of the HVAC systems, further improvement of these devices is warranted. For example, typically, in order to capture feedback from a consumer, customer, or user of an HVAC system, direct correspondence with the consumer is required, which usually requires a personal meeting between the consumer and a representative associated with a vendor of the HVAC system. While such meetings can be effective and beneficial to both the consumer and the vendor, they can also be quite time consuming, as there are a vast number of consumers.

Moreover, when the thermostat or BAS of the HVAC (or other component associated with the HVAC system) fails or become faulty, local vendor intervention is required, which usually entails dispatching a triage technician to assess the failure, and, subsequently, the triage technician contacting technical support to report their assessment. If technical support is contacted, error artifacts (e.g., log files, call traces, memory dumps, etc.) are provided to technical support so that a cause and a possible fix of the failure can be determined.

Furthermore, conventional thermostats or BASs are not configured to provide information or data relating to how the thermostat or BAS of the HVAC is being utilized in the consumer environment, and there is no known method by which to ascertain how many or which devices/applications are being used at a given HVAC location, apart from direct contact with vendors, which, again, can be quite time consuming.

SUMMARY

The present disclosure has been made to address the above problems and disadvantages, and to provide at least the advantages described below. Accordingly, an aspect of the present disclosure provides an HVAC system configured for automated failure triage, inventory analysis, and customer feedback communication, thereby improving consumer-vendor relationships, overall reaction time and quality as it relates to repair and maintenance of the HVAC system, and an understanding on how a consumer is using the HVAC system.

In accordance with an aspect of the present disclosure, there is provided a heating, ventilation and air condition (HVAC) system configured for automated failure triage, inventory analysis, and customer feedback communication. The HVAC system includes a controller in operable communication with at least one peripheral component of the HVAC system for receiving information relating to the at least one peripheral component, and configured to receive customer feedback information, and a server in operable communication with the controller for receiving and analyzing the information relating to the at least one peripheral component and the customer feedback information.

The server can be cloud based, and the controller can bundle the information relating to the at least one peripheral component, and can transmit the bundled information to the server for triage and assessment.

The server can be configured to archive the information relating to the at least one peripheral component and the customer feedback information. The information relating to the at least one peripheral component can include one of a name of the at least one peripheral component, a location of the HVAC system, technical data, logs, stack dumps, backups, a description of a failure of the at least one peripheral component, and inventory needed to correct the failure of the at least one peripheral component.

The server can be configured to transmit the information relating to the at least one peripheral component and the customer feedback information to one of a product management entity and a change control board entity where: the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

In accordance with an aspect of the present disclosure, there is provided a method of use for a heating, ventilation and air condition (HVAC) system configured for automated failure triage, inventory analysis, and customer feedback communication. The method includes receiving, by a controller in operable communication with at least one peripheral component of the HVAC system, information relating to the at least one peripheral component and customer feedback information and receiving and analyzing, at a server in operable communication with the controller, the information relating to the at least one peripheral component and the customer feedback information.

The server can be cloud based, and the method can include bundling, at the controller, the information relating to the at least one peripheral component, and transmitting, from the controller, the bundled information to the server for triage and assessment.

The method can include archiving, at the server, the information relating to the at least one peripheral component and the customer feedback information, and archiving the information relating to the at least one peripheral component can include archiving information including one of a name of the at least one peripheral component, a location of the HVAC system, technical data, logs, stack dumps, backups, a description of a failure of the at least one peripheral component, and inventory needed to correct the failure of the at least one peripheral component.

The method can include transmitting, from the server, the information relating to the at least one peripheral component and the customer feedback information to one of a product management entity and a change control board entity where: the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

In accordance with an aspect of the present disclosure, there is provided a building automation system (BAS) for controlling a heating, ventilation and air condition (HVAC) system. The BAS includes a controller in operable communication with at least one peripheral component of the HVAC system for receiving information relating to the at least one peripheral component, and configured to receive customer feedback information and a server in operable communication with the controller for receiving and analyzing the information relating to the at least one peripheral component and the customer feedback information.

The server can be cloud based, and the controller can bundle the information relating to the at least one peripheral component, and can transmit the bundled information to the server for triage and assessment.

The server can be configured to archive the information relating to the at least one peripheral component and the customer feedback information. The information relating to the at least one peripheral can include one of a name of the at least one peripheral component, a location of the HVAC system, technical data, logs, stack dumps, backups, a description of a failure of the at least one peripheral component, and inventory needed to correct the failure of the at least one peripheral component.

The server can be configured to transmit the information relating to the at least one peripheral component and the customer feedback information to one of a product management entity and a change control board entity where: the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

BRIEF DESCRIPTION OF THE DRAWINGS

The embodiments of the present invention may be more completely understood in consideration of the following detailed description of various embodiments in connection with the accompanying drawings, in which.

Figure 1:
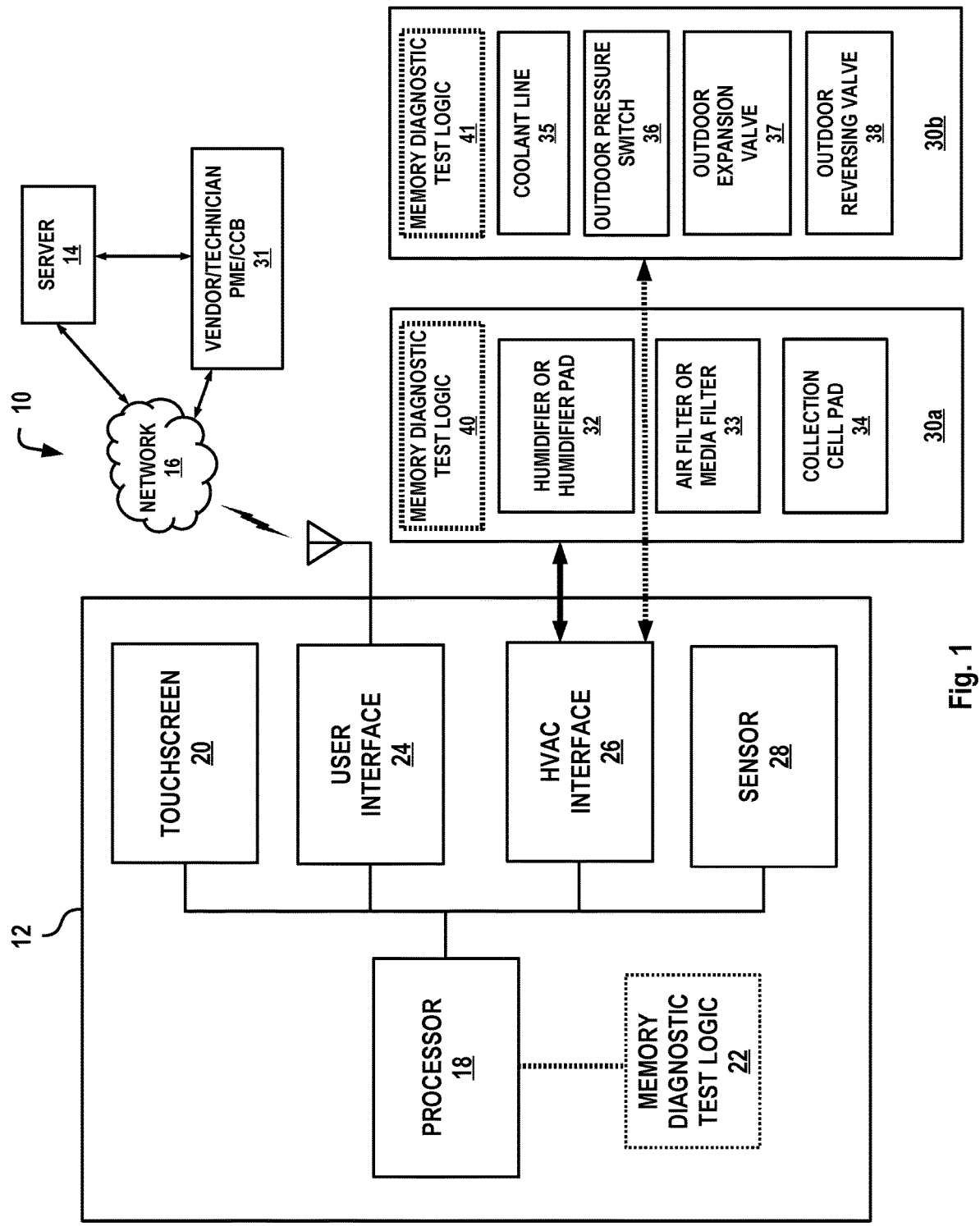
FIG. 1 is a diagram of a system including a thermostat, according to an embodiment of the present disclosure.

The various aspects of the present disclosure mentioned above are described in further detail with reference to the aforementioned figures and the following detailed description of embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in any appropriately detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. It should be appreciated that the particular implementations described herein are illustrative of the disclosure and its best mode and are not intended to otherwise limit the scope of the present disclosure in any way. One skilled in the art will also appreciate that, for security reasons, any element of the present disclosure may consist of any combination of databases or components at a single location or at multiple locations, wherein each database or system includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

The systems and methods of the invention can be utilized in a residential, local or widely distributed HVAC system, from a single family unit or building to an enterprise level, encompassing virtually any structure, cluster, campus, and areas therebetween. Systems and methods for residential and commercial HVAC control are disclosed in U.S. patent application Ser. No. 11/208,773, now U.S. Pat. No. 8,050,801, filed Aug. 22, 2005, entitled "Dynamically Extensible and Automatically Configurable Building Automation System and Architecture" and U.S. patent application Ser. No. 15/186,715 (U.S. Patent Publication No. 2016/0370023), filed Jun. 20, 2016, entitled "Fault Detection and Diagnostics System Utilizing Service Personal Feedback for Improved Accuracy," both of which are assigned to the assignee of the present application, and are herein incorporated by reference.

As noted above, conventional HVAC systems including smart thermostats and/or BASs are not configured for automated failure triage, inventory analysis, and customer feedback communication. Accordingly, an HVAC system including a thermostat (or an HVAC system that is controlled by a BAS) configured for automated failure triage, inventory analysis, and customer feedback communication is now herein described. For illustrative purposes, the aspects of the present disclosure will be described herein with reference to a thermostat.

FIG. 1 is a diagram of a system 10 including a thermostat 12 that is in operable communication with a server 14 (or portal, e.g., the NEXIA® server portal) via a network 16, according to an embodiment of the present disclosure. The server 14 can be cloud based and can communicate with a technician (and/or a manufacturer, dealer/vendor, etc.) authorized to service an HVAC system that is controlled by the thermostat 12 via the network 16. The server 14 can also communicate with a product management entity (PME) and/or a change control board entity (CCBE) (collectively and individually 31), both of which can include a team of engineers, marketing personal, etc., who are equipped to evaluate errors (faults), decide severity of errors, prioritize the errors, formulate possible solutions/fixes for the errors, etc.

The thermostat 12 includes a processor 18 (or controller, e.g., Tracer™ SC, manufactured by Trane International Inc. of Davidson, N.C., USA.), a touch screen 20, a memory 22, a user interface (UI) 24, an HVAC interface 26, and a sensor 28, which monitors one or more peripheral components of an indoor unit 30a and/or outdoor unit 30b of the HVAC system, as will be described in greater detail below.

When the processor 18 is a component of a BAS (i.e., HVAC system is operable in a commercial environment), the processor 18 controls the overall operation of the HVAC system and can communicate, via a wired or wireless interface, with the components of the HVAC system. For example, the processor 18 can communicate with the components of the HVAC system using a wireless communication protocol including, without limitation, any variant of IEEE 802.11 (commonly known as WiFi), variants of IEEE 802.15 wireless personal area networking such as Bluetooth® and ZWave®, and other wireless standards such as ZigBee® or the AirFi™ protocol promulgated by Trane International Inc. Alternatively, the processor 18 can be configured to communicate using a wired protocol using dedicated data lines (e.g., Ethernet, RS-485), via powerline communication links using, for example, IEEE 1901 and/or X10®, or via a dual-band (wireless plus powerline) protocol such as the Insteon® protocol.

Likewise, when the processor 18 is a component of an HVAC system used in a residential environment, the processor 18 can control the overall operation of the HVAC system, via the HVAC interface 26, and can be configured for communication with the one or more peripheral components via the network 16 (which may include a LAN and/or the public internet). The HVAC interface 26 may be configured to communicate between thermostat 12 and the one or more peripheral components using any communications protocol suitable for use with the system. For example, and without limitation, where the indoor unit 30a, the outdoor unit 30b, and/or furnaces (not explicitly shown) employ single- or dual-speed motors, HVAC interface 26 may include a 24V switched circuit interface which operates with well-known HVAC color-coded wiring schemes (Rc, Rh, C, Y, W, Y2, W2, G, E, O, V, etc.). Where the indoor unit 30a and/or outdoor unit 30b employ variable-speed motors, HVAC interface 26 may include a digital signaling interface such as, without limitation, CANbus, RS-485, ComfortLink II™, ClimateTalk™, and the like. In embodiments, HVAC interface 26 may operate using both 24V switched circuits and digital signaling protocols to flexibly accommodate any combination of HVAC equipment. In embodiments, any of the functions of data interface 14 may be performed by HVAC interface 26, and vice versa. In embodiments, HVAC interface 26 may be incorporated within data interface 14.

Additionally or alternatively, the processor 18 can be configured for communication with one or more remote devices that are in operable communication with the HVAC system via network 16 (which may include a LAN and/or the public internet). The remote device may include, without limitation, a mobile device (smart phone, tablet computer, and the like) and/or the remote server 14 (such as a dealer diagnostic portal, a fuel marketplace server, a weather data provider, other data providers, and so forth). Furthermore, the processor 18 can be configured to communicate using a wide area cellular mobile network using, for example and without limitation, a GSM protocol (EDGE, 3G, 4G, LTE etc.), a CDMA protocol (EV-DO, SV-DO, etc.), and so forth.

The processor 18 can include a data interface module (not shown), which can function as a WiFi/AirFi™ hot-spot or wired router to enable the processor 18 and/or the components of the HVAC system (e.g., the thermostat 12) or other components (e.g., one or more smart devices including, without limitation, a smart watch, a smart phone, a smart tablet, smart remote, etc.) in operative communication with the processor 18 to connect to the network 16 (or the Internet).

The HVAC interface 26, under the control of the processor 18 and in conjunction with the sensor 28, can monitor a status of the indoor unit 30a and/or the outdoor unit 30b including the one or more peripheral components associated therewith. Some peripheral components of the indoor unit 30b can include, without limitation, a humidifier/a humidifier pad 32, an air filter/media filter 33, a collection cell pad 34, a filter screen, etc., and some peripheral components of the outdoor unit 30b can include, without limitation, a coolant line 35, an outdoor pressure switch 36, an outdoor expansion valve 37, an outdoor reversing valve 38, etc.; each of the indoor unit 30a and/or the outdoor unit 30b can also include memory test logic 40 and memory test logic 41, respectively.

The peripheral components, when faulty, can cause either or both of the indoor unit 30a and the outdoor unit 30b to function improperly. For example, a fault condition, e.g., a low pressure on the outdoor unit 30b (e.g., an air conditioner or a heat pump unit) can be a result of low refrigerant charge, faulty outdoor pressure switch(es), faulty outdoor expansion valve, faulty outdoor reversing valve, or faulty outdoor compressor.

When a fault is detected, the processor 18 analyzes information relating to a faulty peripheral component, bundles the information, and transmits the bundled information to the server 14 for triage and assessment. The information relating to the peripheral component can include, but is not limited to, a name of peripheral component, a location of the HVAC system, technical data, logs, stack dumps, backups, a description of a failure of the peripheral component, and inventory (e.g., tools, parts, etc.) needed to correct the failure of the component.

Figure 2:
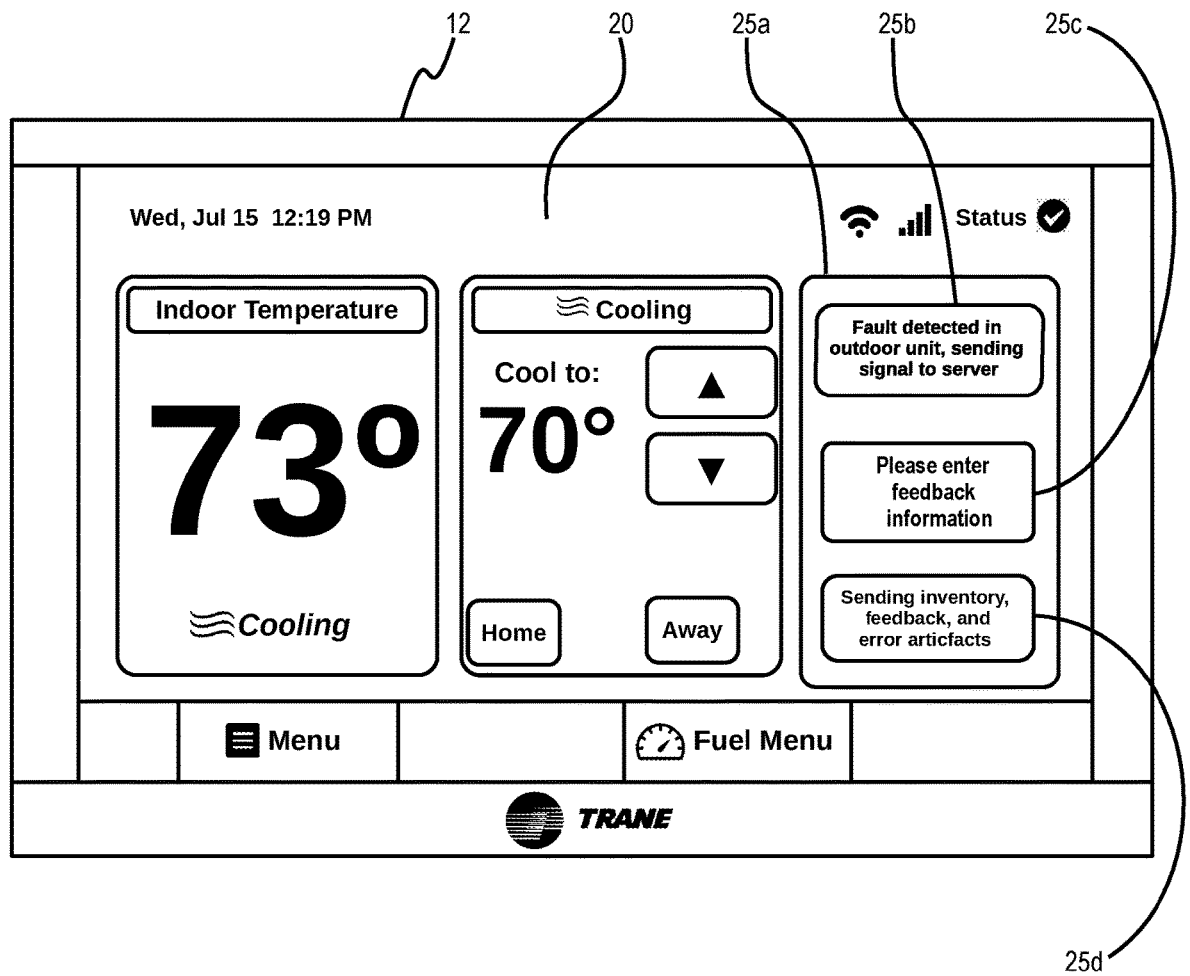
FIG. 2 is a diagram of a graphical user interface displayed on the thermostat of FIG. 1.

The touch screen 20, under the control of the processor 18 and in conjunction with the user interface 24, can display one or more graphical user interfaces (GUIs) when a fault is detected in the indoor unit 30*a* and/or outdoor unit 30*b* by the thermostat 12. For example, the touch screen 20 can display a GUI 25*a* including one or more sub-GUIs 25*b*-25*d*. More particularly, a sub-GUI 25*b* can be used to indicate to a user that the fault has been detected in the HVAC system (e.g., the outdoor unit 30*b*), a determined faulty peripheral component, and that a notification has been sent to the server 14 (see FIG. 2, for example). A sub-GUI 25*c* can be used to indicate to a user that feedback information needs to be entered (feedback request), and upon a touch input received thereon from the user, can output a GUI 27, as described below. Additionally, a sub-GUI 25*d* can be used to indicate to a user that inventory, feedback, and error artifacts are being sent to a vendor and/or a server. While not illustrated, additional information can also be displayed in the GUI 25*a* including, but not limited to, that the server is performing a diagnostic test and that a technician is being dispatched, where applicable.

Figure 3:
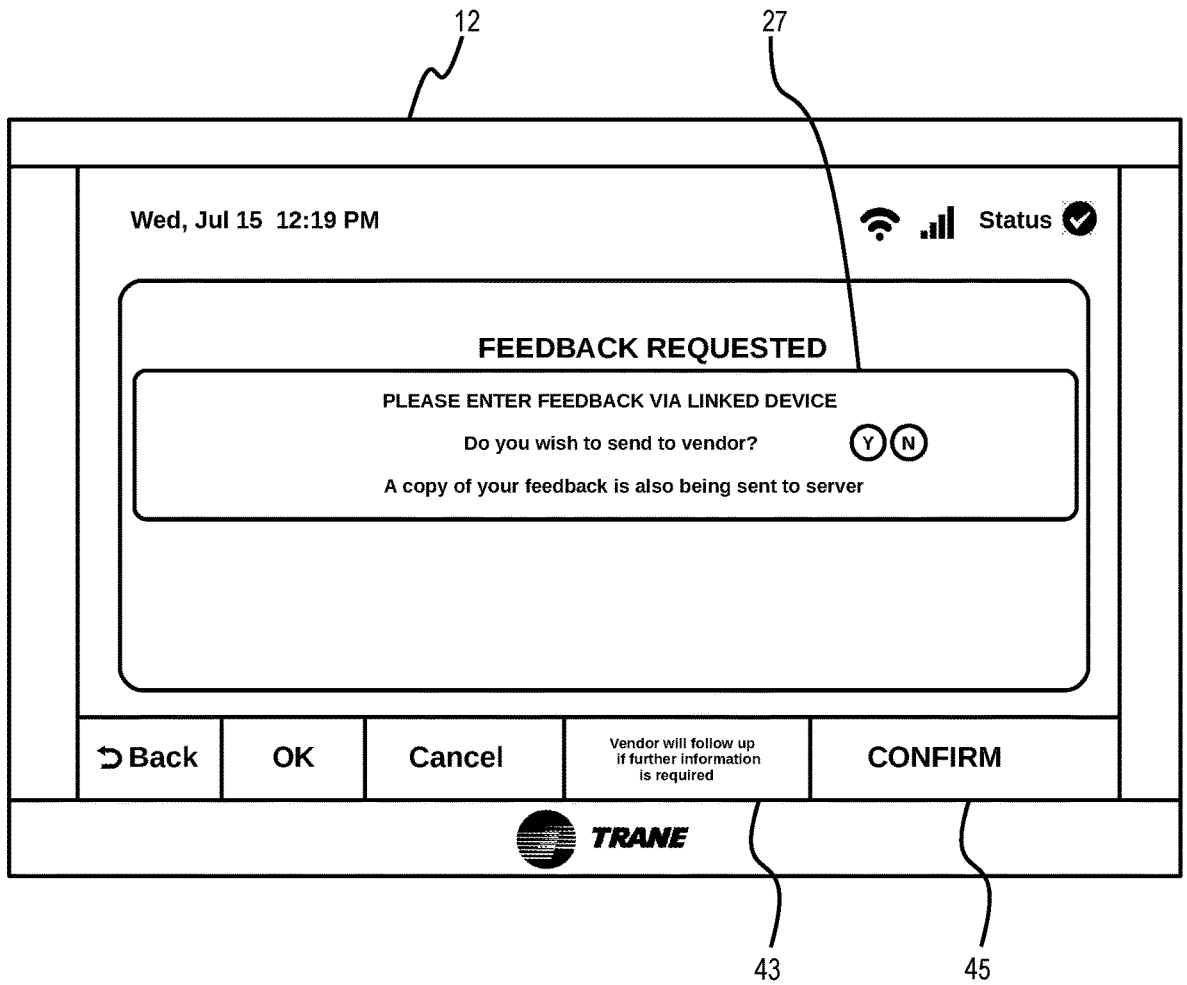
FIG. 3 is a diagram of a graphical user interface displayed on the thermostat of FIG. 1.

The touch screen 20, under the control of the processor 18 and in conjunction with the user interface 24, can display the GUI 25*c* for prompting a user to enter feedback information, which can be entered directly into the thermostat 12 via the touch screen 20, or indirectly through one or more linked mobile devices. For example, FIG. 3 illustrates a GUI 27 that can be displayed on the touchscreen 20 which can be used to prompt a user to enter feedback information via a linked mobile device. In this instance, the user can enter the requested information via a smart device (e.g., tablet), and the user can be provided with an option to send the feedback information to the vendor. A copy of the user feedback information can also be sent to the server 14.

The request for user feedback can be displayed at predetermined times, e.g., weekly, monthly, semi-annually, annually, at the occurrence of a specified event, etc., or the request for feedback information can be displayed at the request of the PME/CCBE 31. For example, after a service call has been completed by a technician, the PME/CCBE 31 can send a feedback request via the network 16, either directly to the thermostat 12 or indirectly through the server 14, to request feedback information relating to the service call, e.g., was the customer satisfied with the service provided by the technician.

The server 14 receives the user feedback information and the bundled information from the processor 18 and assesses and archives this information. The feedback information and bundled information can be transmitted separately or together to the server 14. In an embodiment, the server 14 can transmit the user feedback information to the PME 31 and the bundled information to the CCBE 31, or vice versa. In an embodiment, the server 14 can also email the feedback information and bundled information to the PME/CCBE 31.

The PME/CCBE 31 can evaluate the information relating to the peripheral component to determine the failure of the peripheral component, a severity of the failure of the peripheral component, assign a priority if more than one failure of the peripheral component is detected, assign a priority if more than one peripheral component is detected, and possible solutions to the failure of the peripheral component. Likewise, the PME/CCBE 31 can evaluate the user feedback information to determine how the HVAC system is being used by the user, a location of the HVAC system, a location of a vendor associated with the HVAC system of the customer, a number of devices associated with the HVAC system, and applications and their respective quantities of the HVAC system.

Figure 4:
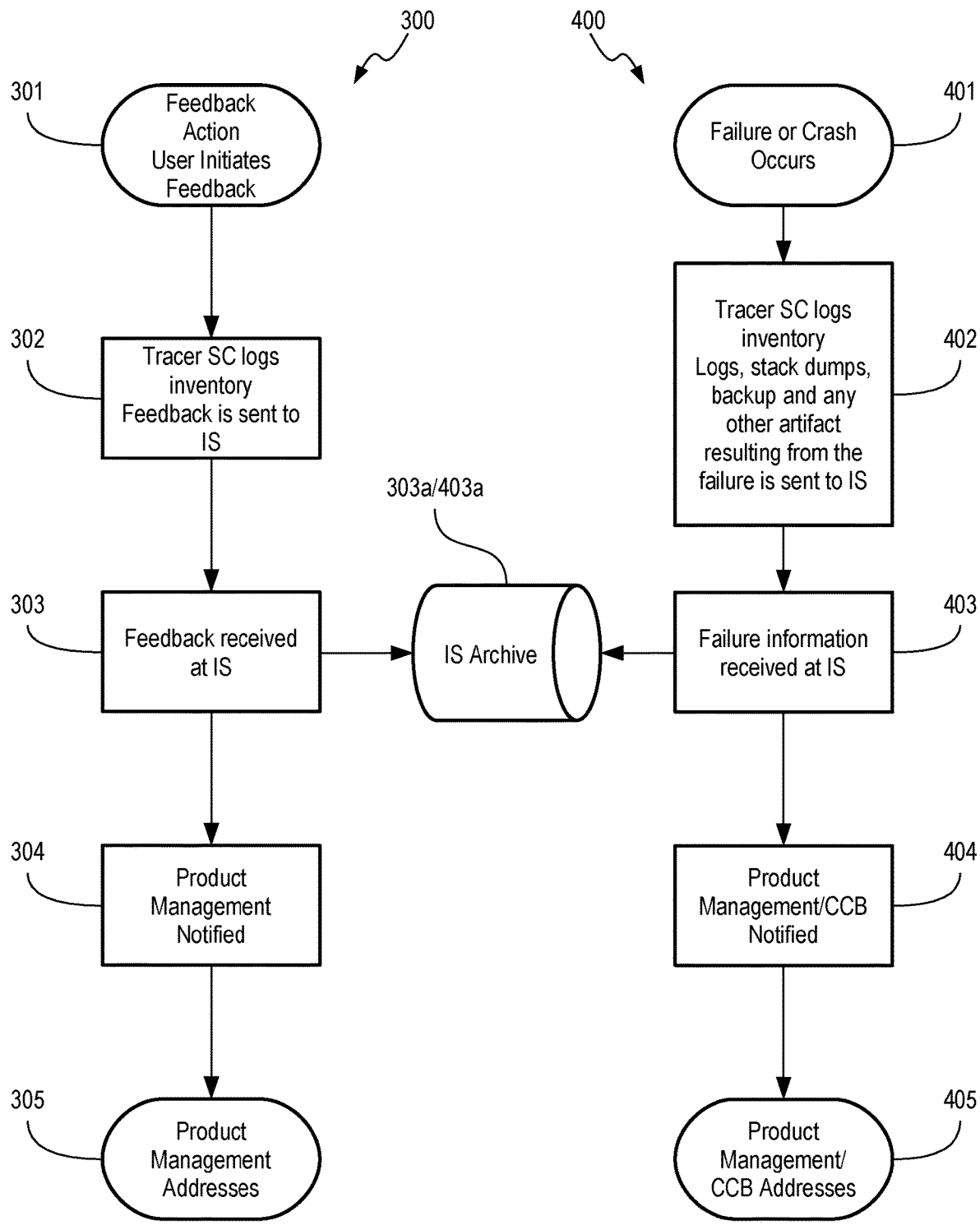
FIG. 4 is a flowchart of a method of use for a heating, ventilation and air condition (HVAC) system configured for automated failure triage, inventory analysis, and customer feedback communication, according to an embodiment of the present disclosure.

FIG. 4 is a flowchart of a method 300/400 an HVAC system configured for automated failure triage, inventory analysis, and customer feedback communication, according to an embodiment of the present disclosure.

At step 301, under the control of the processor 18, the user interface 24 can display the GUI 27 on the touchscreen 20, as a result of a user initiated feedback request. For example, the user can enter feedback information relating to a recently completed service call. A GUI 43 can be displayed indicating that a vendor will follow up if more information is required from the user, and an optional GUI 45 can be displayed to confirm that all feedback has been entered.

Similarly, at step 401, under the control of the processor 18, the HVAC interface 26 and sensor 28 of the thermostat 12 can monitor one more of the previously described peripheral components of the HVAC system, using various monitoring techniques. For example, it may be determined that there is low pressure in the outdoor unit 30*b*, a root cause of which cannot be determined at the thermostat 12.

At steps 302/402, the processor 18 analyzes the information relating to the peripheral component and the user feedback information, and also bundles this information for transmitting to the server 14, at steps 303/403. In an embodiment, the information relating to the peripheral component and the user feedback information can be transmitted together or separately to the server 14. Moreover, the processor 18 can transmit the information relating to the peripheral component and the user feedback information directly to the PME/CCBE 31.

Once received at the server 14, the information relating to the peripheral component and the user feedback information can be analyzed to determine, for example, the root cause of the fault and the tools needed to correct the fault.

At steps 303*a*/404*a*, the server 14 can archive the information relating to the peripheral component and the user feedback information.

After the information relating to the peripheral component and the user feedback information is analyzed, the server 14 can determine where the analyzed information needs to be routed to. For example, the server 14 can determine that the information relating to the peripheral component needs to be routed to the CCBE 31 and the user feedback information needs to be routed to the PME 31. Accordingly, at steps 304/404, the server 14 can transmit the user feedback information and the information relating to the peripheral component to the PME/CCBE 31, respectively.

Once the user feedback information and the information relating to the peripheral component is received at the PME/CCBE 31, at steps 305/405 they can evaluate the user feedback information and the information relating to the peripheral component to determine what, if any, further steps need to be taken. For example, the PME 31 may determine that a representative associated with a vendor of the HVAC system needs to be sent to visit with a customer. Likewise, the CCBE 31 may determine that a technician needs to be dispatched to fix the root cause of the fault, and they may also provide the technician with information relating to the required tools and replacement part(s) needed to fix the fault.

In accordance with the instant disclosure, the system 10 including the thermostat 12 (or a controller of the BAS) provides a better understanding how the thermostat 12 (or the BAS) of the HVAC system is being used by a consumer. As can be appreciated, having the ability to learn more about consumer behavior, can facilitate development and/or improve a quality of these devices, and can help manufactures make more educated marketing decisions about these devices. Additionally, the system 10 including the thermostat 12 (or a controller of the BAS) can improve a reaction time with respect to how quickly a technician can be dispatched to a location to fix a faulty peripheral component.

From the foregoing and with reference to the various Figures, those skilled in the art will appreciate that certain modifications can also be made to the present disclosure without departing from the scope of the same. For example, while it has been described herein that the processor 18 transmits the user feedback information and the information relating to the peripheral component to the server 14, the present disclosure is not so limited. For example, the processor 18 can transmit the user feedback information and the information relating to the peripheral component directly to a vendor and/or a technician.

ASPECTS

It is noted that any of aspects 1-18 may be combined with each other in any suitable combination.

Aspect 1. A heating, ventilation and air condition (HVAC) system configured for automated failure triage, inventory analysis, and customer feedback communication, the HVAC system comprising: a controller in operable communication with at least one peripheral component of the HVAC system for receiving information relating to the at least one peripheral component, and configured to receive customer feedback information; and a server in operable communication with the controller for receiving and analyzing the information relating to the at least one peripheral component and the customer feedback information.

Aspect 2. The system in accordance with aspect 1, wherein the server is cloud based.

Aspect 3. The system in accordance with aspect 1 or 2, wherein the controller is configured to bundle the information relating to the at least one peripheral component and transmit the bundled information to the server for triage and assessment.

Aspect 4. The system in accordance with any of aspects 1-3, wherein the server is configured to archive the information relating to the at least one peripheral component and the customer feedback information.

Aspect 5. The system in accordance with any of aspects 1-4, wherein the information relating to the at least one peripheral component includes one of a name of the at least one peripheral component, a location of the HVAC system, technical data, logs, stack dumps, backups, a description of a failure of the at least one peripheral component, and inventory needed to correct the failure of the at least one peripheral component.

Aspect 6. The system in accordance with any of aspects 1-5, wherein the server is configured to transmit the information relating to the at least one peripheral component and the customer feedback information to one of a product management entity and a change control board entity where: the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

Aspect 7. A method of use for a heating, ventilation and air condition (HVAC) system configured for automated failure triage, inventory analysis, and customer feedback communication, the method comprising: receiving, by a controller in operable communication with at least one peripheral component of the HVAC system, information relating to the at least one peripheral component and customer feedback information; and receiving and analyzing, at a server in operable communication with the controller, the information relating to the at least one peripheral component and the customer feedback information.

Aspect 8. The method in accordance with aspect 7, wherein the server is cloud based.

Aspect 9. The method in accordance with aspect 7 or 8, further comprising bundling, at the controller, the information relating to the at least one peripheral component and transmitting, from the controller, the bundled information to the server for triage and assessment.

Aspect 10. The method in accordance with any of aspects 1-9, further comprising archiving, at the server, the information relating to the at least one peripheral component and the customer feedback information.

Aspect 11. The method in accordance with any of aspects 1-10, wherein archiving the information relating to the at least one peripheral component includes archiving information including one of a name of the at least one peripheral component, a location of the HVAC system, technical data, logs, stack dumps, backups, a description of a failure of the at least one peripheral component, and inventory needed to correct the failure of the at least one peripheral component.

Aspect 12. The method in accordance with any of aspects 1-11, further comprising transmitting, from the server, the information relating to the at least one peripheral component and the customer feedback information to one of a product management entity and a change control board entity where: the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

Aspect 13. A building automation system (BAS) for controlling a heating, ventilation and air condition (HVAC) system, the BAS comprising: a controller in operable communication with at least one peripheral component of the HVAC system for receiving information relating to the at least one peripheral component, and configured to receive customer feedback information; and a server in operable communication with the controller for receiving and analyzing the information relating to the at least one peripheral component and the customer feedback information.

Aspect 14. The BAS in accordance with aspect 13, wherein the server is cloud based.

Aspect 15. The BAS in accordance with aspect 13 or 14, wherein controller is configured to bundle the information relating to the at least one peripheral component and transmit the bundled information to the server for triage and assessment.

Aspect 16. The BAS in accordance with any of aspects 13-15, wherein the server is configured to archive the information relating to the at least one peripheral component and the customer feedback information.

Aspect 17. The BAS in accordance with any of aspects 13-16, wherein the information relating to the at least one peripheral includes one of a name of the at least one peripheral component, a location of the HVAC system, technical data, logs, stack dumps, backups, a description of a failure of the at least one peripheral component, and inventory needed to correct the failure of the at least one peripheral component.

Aspect 18. The BAS in accordance with any of aspects 13-17, wherein the server is configured to transmit the information relating to the at least one peripheral component and the customer feedback information to one of a product management entity and a change control board entity where: the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A heating, ventilation and air condition (HVAC) system configured for automated failure triage, inventory analysis, and customer feedback communication, the HVAC system comprising:
   a user interface device that, in response to a condition being satisfied, presents an element requesting customer feedback information indicative of how the HVAC system is being used;
   a controller in operable communication with the user interface device and at least one peripheral component of the HVAC system for receiving information relating to the at least one peripheral component, and configured to receive the customer feedback information; and
   a server, in operable communication with the controller, that receives and analyzes the information relating to the at least one peripheral component and the customer feedback information, and identifies a failure of the at least one peripheral component based at least in part on the customer feedback information indicative of how the HVAC system is being used.

2. The system of claim 1, wherein the server is cloud based.

3. The system of claim 1, wherein the controller is configured to bundle the information relating to the at least one peripheral component and transmit the bundled information to the server for triage and assessment.

4. The system of claim 1, wherein the server is configured to archive the information relating to the at least one peripheral component and the customer feedback information.

5. The system of claim 1, wherein the information relating to the at least one peripheral component includes one of a name of the at least one peripheral component, a location of the HVAC system, technical data, logs, stack dumps, backups, a description of the failure of the at least one peripheral component, and inventory needed to correct the failure of the at least one peripheral component.

6. The system of claim 5, wherein the server is configured to transmit the information relating to the at least one peripheral component and the customer feedback information to one of a product management entity and a change control board entity where:
   the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and
   the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

7. A method of use for a heating, ventilation and air condition (HVAC) system configured for automated failure triage, inventory analysis, and customer feedback communication, the method comprising:
   presenting, at a user interface device, a graphical element requesting customer feedback information indicative of how the HVAC system is being used;
   receiving, by a controller in operable communication with at least one peripheral component of the HVAC system and the user interface device, information relating to the at least one peripheral component and the customer feedback information; and
   receiving and analyzing, at a server in operable communication with the controller, the information relating to the at least one peripheral component and the customer feedback information and identifying a failure of the at least one peripheral component based at least in part on the customer feedback information that is indicative of how the HVAC has been used.

8. The method of claim 7, wherein the server is cloud based.

9. The method of claim 7, further comprising bundling, at the controller, the information relating to the at least one peripheral component and transmitting, from the controller, the bundled information to the server for triage and assessment.

10. The method of claim 7, further comprising archiving, at the server, the information relating to the at least one peripheral component and the customer feedback information.

11. The method of claim 10, wherein archiving the information relating to the at least one peripheral component includes archiving information including one of a name of the at least one peripheral component, a location of the HVAC system, technical data, logs, stack dumps, backups, a description of the failure of the at least one peripheral component, and inventory needed to correct the failure of the at least one peripheral component.

12. The method of claim 11, further comprising transmitting, from the server, the information relating to the at least one peripheral component and the customer feedback information to one of a product management entity and a change control board entity where:
   the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and
   the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

13. A building automation system (BAS) for controlling a heating, ventilation and air condition (HVAC) system, the BAS comprising:
   a user interface device that presents an element requesting the customer feedback information indicative of how the HVAC system is being used;
   a controller in operable communication with the user interface device and at least one peripheral component of the HVAC system for receiving information relating to the at least one peripheral component, and configured to receive customer feedback information;
   a server, in operable communication with the controller, that receives and analyzes the information relating to the at least one peripheral component and the customer feedback information, and identifies a failure of the at least one peripheral component based at least in part on the customer feedback information indicative of how the HVAC system is being used.

14. The BAS of claim 13, wherein the server is cloud based.

15. The BAS of claim 13, wherein the controller is configured to bundle the information relating to the at least one peripheral component and transmit the bundled information to the server for triage and assessment.

16. The BAS of claim 13, wherein the server is configured to archive the information relating to the at least one peripheral component and the customer feedback information.

17. The BAS of claim 16, wherein the information relating to the at least one peripheral component includes one of a name of the at least one peripheral component, a location of the HVAC system, technical data, logs, stack dumps, backups, a description of the failure of the at least one peripheral component, and inventory needed to correct the failure of the at least one peripheral component.

18. The BAS of claim 17, wherein the server is configured to transmit the information relating to the at least one peripheral component and the customer feedback information to one of a product management entity and a change control board entity where:
   the information relating to the at least one peripheral component is evaluated to determine the failure of the at least one peripheral component, a severity of the failure of the at least one peripheral component, assign a priority if more than one failure of the at least one peripheral component is detected, assign a priority if more than one at least one peripheral component is detected, and possible solutions to the failure of the at least one peripheral component; and
   the customer feedback information is evaluated to determine how the HVAC system is being used by the customer, a location of the HVAC system, a location of a vendor associated with the HVAC system of the customer, a number of devices associated with the HVAC system, and applications and their respective quantities of the HVAC system.

19. The system of claim 1, wherein the condition is satisfied in response to a scheduled calendar time being determined to occur.

20. The system of claim 1, wherein the condition is satisfied in response to an event being determined to occur.

* * * * *